US012730227B2

(12) United States Patent
Bouvet et al.

(10) Patent No.: US 12,730,227 B2
(45) Date of Patent: Sep. 8, 2026

(54) METHOD AND SYSTEM FOR LOCALIZING RADIO EQUIPMENT USING AT LEAST TWO SATELLITE CONSTELLATIONS

(71) Applicant: THALES, Courbevoie (FR)

(72) Inventors: Denis Bouvet, Valence (FR); Jean-Pierre Arethens, Valence (FR)

(73) Assignee: THALES, Courbevoie (FR)

(*) Notice: Subject to any disclaimer, the term of this patent is extended or adjusted under 35 U.S.C. 154(b) by 339 days.

(21) Appl. No.: 18/265,955

(22) PCT Filed: Dec. 9, 2021

(86) PCT No.: PCT/EP2021/085009

§ 371 (c)(1),
(2) Date: Jun. 7, 2023

(87) PCT Pub. No.: WO2022/128736

PCT Pub. Date: Jun. 23, 2022

(65) Prior Publication Data

US 2024/0027627 A1 Jan. 25, 2024

(30) Foreign Application Priority Data

Dec. 17, 2020 (FR) ...................................... 2013415

(51) Int. Cl.
*G01S 19/20* (2010.01)
*G01S 19/33* (2010.01)

(52) U.S. Cl.
CPC .............. *G01S 19/20* (2013.01); *G01S 19/33* (2013.01)

(58) Field of Classification Search
None
See application file for complete search history.

(56) References Cited

U.S. PATENT DOCUMENTS 10,613,233 B2 * 4/2020 Skalicky ............... G01S 19/421
2008/0270027 A1 * 10/2008 Stecko .................. B64D 39/00 701/476
2018/0081064 A1 3/2018 Skalicky et al.

OTHER PUBLICATIONS

Rippl, "Real Time Advanced Receiver Autonomous Integrity Monitoring in DLR's Multi-Antenna GNSS Receiver", International Technical Meeting of the Institue of Navigation (ITM2012), pp. 1767-1776, 2012.
Blanch, et al., "Baseline advanced RAIM user algorithm and possible improvements", IEEE Transactions on Aerospace and Electronic Systems, vol. 51, No. 1, pp. 713-732, 2015.

* cited by examiner

*Primary Examiner* — Resha Desai
*Assistant Examiner* — Brandon James Henson
(74) *Attorney, Agent, or Firm* — Baker Hostetler

(57) ABSTRACT

A localization method, implemented in a satellite system includes at least a first constellation associated with a probability of occurrence of multiple failures lower than a given integrity risk, where the method may advantageously comprise the following steps implemented by a radioelectric device: receive a plurality of navigation signals; select failure modes to be monitored other than the multiple failures of the first constellation; determine a navigation solution and a plurality of navigation sub-solutions; calculate, for each navigation sub-solution, one or more corresponding detection thresholds; calculate one or more protection levels.

12 Claims, 4 Drawing Sheets

| Number of satellites $N_{sat} = 2N^{(1)} = 2N^{(2)}$ | 12 | 16 | 20 | 24 | 28 | 32 |
|---|---|---|---|---|---|---|
| [Blanch, *et al.*, 2015] algorithm with $P_{sat}^{(2)} = 10^{-3}$ and $P_{const}^{(2)} = 10^{-3}$ | 15 | 34 | 78 | 130 | 191 | 260 |
| [Blanch, *et al.*, 2015] algorithm with $P_{sat}^{(2)} = 10^{-4}$ and $P_{const}^{(2)} = 10^{-4}$ | 22 | 37 | 81 | 134 | 196 | 266 |
| Second embodiment | 20 | 26 | 32 | 38 | 44 | 50 |
| Third embodiment with $P_{sat}^{(2)} = 10^{-4}$ and $P_{const}^{(2)} = 10^{-4}$ | 16 | 20 | 28 | 34 | 40 | 46 |
| Third embodiment with $P_{sat}^{(2)} = 10^{-3}$ and $P_{const}^{(2)} = 10^{-3}$ | 20 | 26 | 32 | 38 | 44 | 50 |

METHOD AND SYSTEM FOR LOCALIZING RADIO EQUIPMENT USING AT LEAST TWO SATELLITE CONSTELLATIONS

CROSS-REFERENCE TO RELATED APPLICATIONS

This application is a National Stage of International patent application PCT/EP2021/085009, filed on Dec. 9, 2021, which claims priority to foreign French patent application No. FR 2013415, filed on Dec. 17, 2020, the disclosures of which are incorporated by reference in their entirety.

FIELD OF THE INVENTION

The present invention relates, in general, to the localization of objects, and in particular to a method and a system for localizing radioelectric devices using a satellite system composed of at least two satellite constellations.

BACKGROUND

Certain known localization systems, such as GPS (acronym for "Global Positioning System"), deploy a satellite constellation composed of several non-geostationary satellites for localizing radioelectric devices. Each of these systems generally operates independently of the other localization systems, and radioelectric devices to be localized is generally designed and programmed to operate with a given localization system. It can then happen that a radioelectric device is located within view of satellites not belonging to the localization system with which the radioelectric device is associated, which renders its localization impossible or imprecise.

A radioelectric device may simultaneously receive navigation signals from two or more satellite constellations in order to determine its location. In this case, the radioelectric device carries out one localization per satellite constellation and generally proceeds by averaging in order to determine a final location, without taking into account the specificities of a satellite constellation in terms of probabilities of occurrences of operational failures able to occur within the satellite constellations.

A radioelectric device simultaneously receiving navigation signals coming from several satellite constellations may monitor the failures to which the constellations and their satellites may be subject. This results in a significant processing load which increases with the number of satellite constellations and/or with the number of satellites used.

The document "Real Time Advanced Receiver Autonomous Integrity Monitoring in DLR's Multi-Antenna GNSS Receiver", by Markus Rippl, describes an implementation of the ARAIM method in a receiver of an antenna tracking GPS and Galileo signals. US 2018/0081064 A1 describes a GNSS receiver solution defining satellite distributions in sub-assemblies for calculating protection levels.

There accordingly exists a need for a method and a system for localizing radioelectric devices using a satellite system composed of at least two satellite constellations capable of reducing the processing complexity within the radioelectric device while at the same time guaranteeing a given level of integrity.

SUMMARY OF THE INVENTION

For this purpose, the present invention provides a method for localizing radioelectric devices, implemented in a satellite system comprising a plurality of satellite constellations, each satellite constellation comprising one or more non-geostationary satellites, each satellite constellation being associated with probabilities of occurrence of failures comprising a probability of occurrence of single failures and a probability of occurrence of multiple failures. The satellite system comprises at least a first constellation associated with a probability of occurrence of multiple failures lower than a given integrity risk, at least a second satellite constellation, and at least one radioelectric device to be localized receiving navigation signals coming from a plurality of non-geostationary satellites. Advantageously, the method comprises the following steps implemented by a radioelectric device and consisting in:

- receiving a plurality of navigation signals coming from a plurality of visible non-geostationary satellites belonging at least to the first and to the second satellite constellation;
- selecting failure modes to be monitored corresponding to failures of the satellite constellations other than the multiple failures of the first constellation;
- determining a navigation solution representing a position of the radioelectric device within a given reference frame, using the plurality of navigation signals received, and determining a plurality of navigation sub-solutions, each of the navigation sub-solutions corresponding to a position of the radioelectric device within the given reference frame determined using the navigation signals received other than the navigation signals coming from one or from several visible non-geostationary satellites associated with a selected failure mode;
- calculating, for each navigation sub-solution, one or more corresponding detection thresholds, a failure non-detection condition being satisfied if the differences between the navigation solution and the navigation sub-solution are less than one or more corresponding detection thresholds;
- calculating one or more protection levels associated with the main navigation solution, if the failure non-detection condition is satisfied for all the navigation sub-solutions.

In one embodiment, the probability of occurrence of a combination of single failures in the first constellation may be lower than the given integrity risk.

In another embodiment, the failure modes to be monitored may comprise:

- a first failure mode corresponding to all of the single failures of the first and of the second constellation;
- a second failure mode corresponding to the occurrence of a multiple failure or the combination of several single failures in the second constellation;
- a third failure mode corresponding to a plurality of combinations of a single failure of the first constellation and of a failure, single or multiple, of the second constellation, the other combinations of a single failure of the first constellation and of a failure, single or multiple, of the second constellation not being monitored.

Advantageously, the method may comprise the determination of the plurality of combinations associated with the third failure mode as a function of a given selection threshold, the determination of the plurality of combinations associated with the third failure mode comprising the steps consisting in:

a. selecting all of the failures belonging to the first failure mode and to the second failure mode, which supplies a set of monitored failures;

b. calculating a probability of occurrence of unmonitored failures as a function of the set of the monitored failures;

c. comparing the probability of occurrence of unmonitored failures with the given selection threshold;

d. if the probability of occurrence of unmonitored failures is lower than the given selection threshold, adding an unmonitored combination of a single failure of the first constellation and of a failure, single or multiple, of the second constellation to all of the monitored failures, the added combination being furthermore added to the third failure mode.

The steps b. to d. are iterated until the probability of occurrence of unmonitored failures reaches substantially the given selection threshold.

As a variant, the unmonitored combinations of a single failure of the first constellation and of a failure, single or multiple, of the second constellation may be added to all of the monitored failures according to an increasing or decreasing order of a selection metric, the selection metric being a metric chosen from amongst:

an uncertainty metric associated with the navigation signals supplied by the first constellation;

a minimization metric associated with a covariance matrix of the error in positioning of the sub-solutions relating to the third failure mode;

a metric associated with the impact on the complexity of calculation of the protection levels.

In one embodiment, the number of unmonitored combinations of a single failure of the first constellation and of a failure, single or multiple, of the second constellation may be predefined and may be chosen greater than or equal to two.

In another embodiment, the one or more protection levels may be calculated in an iterative manner by minimizing a predefined cost function, the predefined cost function corresponding to the difference between a risk of exceeding the protection level by the positioning error and an adjusted integrity allocation.

Advantageously, the number of iterations may be less than or equal to three.

As a variant, the one or more protection levels may comprise a horizontal protection level.

In one embodiment, the at least one radioelectric device may be airborne on an aircraft, the one or more protection levels may comprise a horizontal protection level and a vertical protection level.

In another embodiment, the probability of occurrence of single failures and the probability of occurrence of multiple failures associated with the first constellation may be less than $2\times10^{-5}$ and less than $10^{-7}$, respectively.

Advantageously, the probability of occurrence of single failures and the probability of occurrence of multiple failures associated with the second constellation may be less than $10^{-3}$.

A radioelectric device is furthermore provided implemented in a satellite system comprising a plurality of satellite constellations, each satellite constellation comprising one or more non-geostationary satellites, each satellite constellation being associated with probabilities of occurrence of failures comprising a probability of occurrence of single failures and a probability of occurrence of multiple failures, the satellite system comprising at least a first constellation associated with a probability of occurrence of multiple failures lower than a given integrity risk, at least a second satellite constellation, and at least one radioelectric device to be localized receiving navigation signals coming from a plurality of non-geostationary satellites. Advantageously, the radioelectric device comprises:

a signal receiver unit designed to receive a plurality of navigation signals coming from a plurality of visible non-geostationary satellites belonging at least to the first and to the second satellite constellation;

a failure mode selection unit designed to select failure modes to be monitored corresponding to failures of the satellite constellations other than the multiple failures of the first constellation;

a localization unit designed to determine a navigation solution representing a position of the radioelectric device within a given reference frame, using the plurality of received navigation signals, and to determine a plurality of navigation sub-solutions, each of the navigation sub-solutions corresponding to a position of the radioelectric device within the given reference frame determined using the received navigation signals other than the navigation signals coming from one or from several visible non-geostationary satellites associated with a selected failure mode;

a failure detection unit designed to calculate, for each navigation sub-solution, one or more corresponding detection thresholds, a failure non-detection condition being satisfied if the differences between the navigation solution and the navigation sub-solution are less than one or more corresponding detection thresholds;

a computation unit designed to calculate one or more protection levels associated with the main navigation solution, if the failure non-detection condition is satisfied for all the navigation sub-solutions.

The embodiments of the invention allow a higher precision of the localization of the radioelectric devices and higher level of integrity with respect to the solutions of the prior art. The invention may advantageously be applied to autonomous guidance systems of aircraft, ships and terrestrial vehicles.

BRIEF DESCRIPTION OF THE DRAWINGS

Other features and advantages of the invention will become apparent with the aid of the description that follows and of the figures in which.

DETAILED DESCRIPTION

Figure 1:
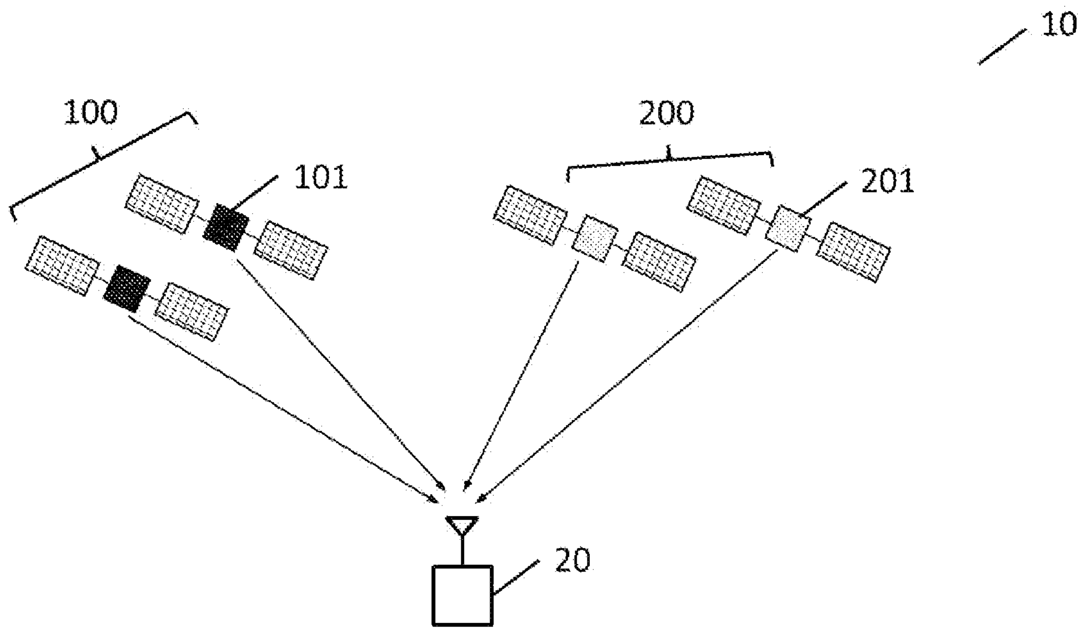
FIG. 1 shows the architecture of a system for localization of radioelectric devices by satellites, according to one embodiment of the invention.

FIG. 1 shows a satellite localization system 10, also referred to as satellite system 10, in which a localization method may be implemented according to embodiments of the invention. The localization system 10 may comprise at least two satellite constellations 100, 200 comprising a first constellation 100 and a second constellation 200. Each of the two satellite constellations 100, 200 may be composed of one or more non-geostationary satellites 101, 201. The localization system 10 may transmit navigation signals in the direction of one or more radioelectric devices 20 to be localized.

Each of the satellite constellations 100, 200 may be composed of a number of non-geostationary satellites 101, 201 which may be quite large. In one embodiment, each satellite constellation 100 or 200 may comprise a number $N^{(1)}$, $N^{(2)}$ of non-geostationary satellites 101, 201, the number of non-geostationary satellite (denoted $N^{(1)}$ for the constellation 100 and denoted $N^{(2)}$ for the constellation 200) being greater than 10. Advantageously, each of the satellite constellations 100, 200 may have worldwide coverage so as to cover the whole of the Earth's surface at any time of the day. Examples of satellite constellations comprise, without limitation, the GPS, Galileo, Beidou and Glonass constellations. The satellite constellations 100, 200 deployed may be subject to operational failures of the "multiple failure" type, furthermore referred to as "constellation failure". Such a type of failure involves at least two satellites from the same constellation 100 or 200 breaking down for a common cause, such as for example a simultaneous updating of several satellites of a constellation using erroneous navigation parameters. Furthermore, each of the two satellite constellations 100, 200 may be associated with a probability of occurrence of multiple failures. In one embodiment, the probability of occurrence of multiple failures of the first constellation 100, denoted $$P_{const}^{(1)},$$

may be different from, for example lower than, the probability of occurrence of multiple failures of the second constellation 200, denoted $$P_{const}^{(2)}.$$

In the following part of the description, it is considered that the probability of occurrence of multiple failures of the first constellation 100 is lower than that of the second constellation 200, by way of non-limiting example.

Each of the non-geostationary satellites 101, 201 forming the two satellite constellations 100, 200 may comprise a platform in order to make the satellite move in a given orbit, where the orbit may for example and without limitation be of the LEO, MEO or other type. In operation, each of the non-geostationary satellites 101, 201 may furthermore comprise a payload allowing the satellite to transmit navigation signals toward the Earth. The payload of a given non-geostationary satellite may for example comprise a unit for generating navigation signals, a high-precision onboard clock, for example of the atomic type, and an RF (Radio Frequency) transmission antenna, preferably non-directional with a wide angular opening.

Advantageously, the non-geostationary satellites 101, 201 forming a satellite constellation 100 or 200 may be identical from a hardware point of view (platform and payload) and their orbital characteristics may be optimized in such a manner as to provide a satellite constellation with worldwide coverage. For example, non-geostationary satellites 101, 201 of the same constellation 100 or 200 may travel at the same altitude and with the same orbital period while following different orbital planes. Furthermore, a non-geostationary satellite belonging to a satellite constellation may be subject to operational failures of the "single failure" type, also referred to as "satellite failure". This type of failure, such as for example an electrical power supply problem or drifts of the onboard clock, involves a single satellite from a constellation. The use of non-geostationary satellites 101, 201 that are identical from a hardware point of view may imply the same probability of occurrence of single failures for all the non-geostationary satellites 101, 201 belonging to the same satellite constellation 100 or 200. Furthermore, the probability of occurrence of single failures of the first constellation 100

$$P_{sat,i}^{(1)}$$

may be different from, for example lower than, the probability of occurrence of single failures of the second constellation 200

$$P_{sat,i}^{(2)}, \text{ where } P_{sat,i}^{(j)}$$

is the probability of failure of a satellite "i" belonging to a constellation "j". In the following part of the description, it is considered that the probability of occurrence of single failures of the first constellation 100 is lower than that of the second constellation 200, by way of non-limiting example.

Furthermore, the satellite system 10 may undergo other types of failures simultaneously involving the first 100 and the second satellite constellation 200 deployed. For example, the satellite system 10 may undergo simultaneously a single failure of a non-geostationary satellite 101 of the first constellation 100 and a multiple failure involving at least two non-geostationary satellites 201 of the second constellation 200, or vice versa. The satellite system 10 may also undergo simultaneously two failures, single or multiple, affecting the same constellation 100 or 200. For example, the second satellite constellation 200 may suffer simultaneously from two single failures involving two non-geostationary satellites 201 breaking down for two different causes.

Furthermore, a radioelectric device 20 to be localized may be of the ground-based type or airborne by means of an aircraft. The radioelectric device 20 may comprise hardware and/or software resources allowing it to receive, in a continuous manner over time, and to process navigation signals transmitted by satellites 101, 201 belonging to the satellite constellations 100, 200 deployed. For example, a radioelectric device 20 may comprise an RF receiving antenna, a receiver for navigation signals and a digital processing unit designed to decode and to demodulate the received navigation signals in order to localize the radioelectric device 20 and to associate a protection level with the localization thus determined. The localization of a radioelectric device 20 may for example comprise the determination of the position of the radioelectric device 20 represented by coordinates in a geocentric Cartesian reference frame (geodesic system), for example.

In one embodiment of the invention, a radioelectric device 20 to be localized may be configured for determining its location using all of the navigation signals, in other words signals based on which the localization may be determined. For the radioelectric device 20 to be localized, the non-geostationary satellites 101, 201 supplying such navigation signals represent visible satellites 101, 201. In particular, visible satellites 101, 201 may be defective, in other words they have suffered an operational failure which may for example be of the single or multiple type. The localization determined by a radioelectric device 20 using all the navigation signals coming from all the visible satellites constitutes a "navigation solution", also called "main navigation solution".

In another embodiment of the invention, a radioelectric device 20 to be localized may exclude from the calculation of its localization one or more navigation signals coming from one or more visible satellites. A localization determined by a radioelectric device 20 excluding one or more navigation signals constitutes a "navigation sub-solution". In particular, a radioelectric device 20 may calculate navigation sub-solutions by excluding navigation signals coming from one or more visible satellites identified as potentially defective. For example, a radioelectric device 20 may calculate, for each main navigation solution, several navigation sub-solutions by excluding for each of them the navigation signals coming from one of the visible satellites 101, 201. In this case, the radioelectric device 20 calculates as many navigation sub-solutions as there are visible satellites. Furthermore, a radioelectric device 20 may calculate a navigation sub-solution excluding the navigation signals coming from all the visible satellites belonging to one of the satellite constellations deployed 100 or 200. Generally speaking, a navigation sub-solution may differ significantly from the associated main navigation solution when one or more visible satellites are defective. In this case, the navigation sub-solution excluding the defective visible satellite or satellites may be closer to the real position of the radioelectric device 20. Advantageously, the radioelectric device 20 may calculate, using the associated main navigation solution, for each navigation sub-solution, a difference representing the distance between the main navigation solution and the navigation sub-solution in question.

Advantageously, a radioelectric device 20 may determine its localization using navigation signals coming from several visible non-geostationary satellites 101, 201 belonging to two satellite constellations 100, 200 deployed. Thus, the main navigation solution and associated navigation sub-solutions may be determined using the two satellite constellations 100, 200 deployed.

Advantageously, one or more protection levels $PL_q$ (q=1, 2,3, . . . ), also referred to as protection radii, may be associated with each main navigation solution determined by a radioelectric device 20. For example, a horizontal protection level and a vertical protection level may be associated with a navigation solution determined by a radioelectric device 20 airborne by means of an aircraft, for example. Alternatively, a single horizontal protection level may be associated with a navigation solution determined by an airborne radioelectric device 20, where the vertical information may, in this case, be supplied by another type of sensor such as an altimeter. The probability associated with a protection level, horizontal for example, may be of the order of $10^{-7}$ and corresponds to the risk of exceeding the protection level by the positioning error, which must be less than $10^{-7}$ per hour. This value is also referred to as integrity risk or integrity allocation and is denoted PHMI in the following part of the description.

The calculation of the protection levels by monitoring all the visible non-geostationary satellites is generally a costly task in terms of processing power, of memory resources, and of processing time. Such resources are not generally available in a radioelectric device 20 which may be airborne by means of an aircraft, of the drone type for example. The monitoring of a visible non-geostationary satellite by a radioelectric device 20 makes reference to the capability of radioelectric device 20 to determine the state of this satellite, in other words its capability to determine whether this satellite is defective or operational. The determination of the state of a visible non-geostationary satellite may be carried out based on the navigation signals received by the radioelectric device 20. For example, the determination of the state of a visible non-geostationary satellite may be carried out by comparing the main navigation solution and the navigation sub-solution excluding the navigation signals coming from the visible non-geostationary satellite in question.

It is known, for a given satellite constellation, not to take into account in the calculation of the protection levels a certain number of failures or, more generally, a certain number of types of failures when their probability of occurrence is less than a certain threshold. In this case, their probability of occurrence may be subtracted from the initial integrity risk. Such an approach is described for example in the article [Blanch, and al., "Baseline advanced RAI M user algorithm and possible improvements", IEEE Transactions on Aerospace and Electronic Systems, 2015] and allows the number of navigation sub-solutions to be calculated to be relatively reduced, but the complexity of calculation of the protection levels remains high with respect to the processing capacity of a radioelectric terminal 20.

In a first embodiment, the radioelectric device 20 to be localized uses at least two satellite constellations 100, 200 such as shown in FIG. 1 for selecting failure modes to be monitored, the selection of the failure modes to be monitored being carried out as a function of the probabilities of occurrence of failures, single and multiple, of the two satellite constellations 100, 200 and as a function of a predefined integrity risk PHMI. In such a first embodiment, the determination of the navigation sub-solutions and the calculation of the protection levels may be carried out by only considering the selected failure modes. For example, a radioelectric device 20 may select failure modes to be monitored for the calculation of the protection levels by excluding a failure mode corresponding to all of the multiple failures of the first constellation 100, the first constellation 100 having probabilities of occurrence of failures such that the probability of occurrence of a multiple failure or of a combination of single failures is lower than the predefined integrity risk.

In a second embodiment, the radioelectric device 20 to be localized uses at least a first 100 and a second satellite constellation 200 such as shown in FIG. 1, the first satellite constellation 100 having probabilities of occurrence of failures such that the probability of occurrence of a multiple failure or of a combination of single failures is lower than a predefined integrity risk. In such a second embodiment, the radioelectric device 20 may select failure modes to be monitored from amongst three failure modes:

In a first failure mode corresponding to all of the single failures of the first 100 and of the second satellite constellation 200, where the occurrence of such a failure mode is able to happen for the $j^{th}$ (j=1 or 2) constellation with the following probability:

$$P^{(j)}_{single\ failure,i} = P_{no\ failure}\frac{P^{(j)}_{sat,i}}{1-P^{(j)}_{sat,i}} \quad (1)$$

$$P^{(j)}_{single\ failure,i}$$

is the probability of occurrence of a single failure in the satellite "i" of the constellation "j" combined with the absence of any other failure. In the equation (1), $$P^{(j)}_{sat,i}$$

is the probability of occurrence of single failures of the satellite i in the constellation j, i=1 to $N^{(j)}$, $N^{(j)}$ being the number of satellites belonging to the constellation (j) and used in the position calculation and the parameter $P_{no\ failure}$ representing the probability of total absence of failure and is given by the relationship $$P_{no\ failure} = P^{(1)}_{no\ failure} \times P^{(2)}_{no\ failure},\ P^{(j)}_{no\ failure}$$

denoting the probability of absence of failure in the constellation j.

In a second failure mode corresponding to the occurrence of a multiple failure or of several single failures in the second satellite constellation 200, the occurrence of a multiple failure in the second constellation 200 can happen with the following probability:

$$P^{(2)}_{multiple\ failure} = P^{(1)}_{no\ failure} \times \left(1 - P^{(2)}_{no\ failure} - P^{(2)}_{pas\ failure}\sum_{i=1}^{N^{(2)}}\frac{P^{(2)}_{sat,i}}{1-P^{(2)}_{sat,i}}\right) \quad (2)$$

in other words the probability of occurrence of any failure in the second constellation which is not a single satellite failure in the absence of any failure (single or multiple) in any satellite of the first constellation.

In a third failure mode corresponding to combinations of a single failure of the first constellation 100 and of any given failure, single or multiple, of the second constellation 200, the occurrence of such a failure mode can happen according to the following relationship:

$$P_{single\ failure\ GNSS1,i\ \&\ failure\ GNSS2} = P^{(1)}_{no\ failure}\frac{P^{(1)}_{sat,i}}{1-P^{(1)}_{sat,i}}\left(1 - P^{(2)}_{no\ failure}\right) \quad (3)$$

For example, all the possible combinations of a single failure of the first constellation 100 and of any given failure of the second constellation 200 may be monitored and taken into account for calculating the navigation sub-solutions. Owing to the low probability of occurrence of other failures, they may advantageously not be monitored and they are taken into account in the probability of occurrence of unmonitored failures, denoted $P_{PNS}$.

The second embodiment advantageously allows:

the number of failures to be monitored by the radioelectric device 20 to be reduced, which allows the processing load to be reduced by decreasing for example the number of navigation sub-solutions to be determined;

the probability of occurrence of unmonitored failures (Pp Ns) to be maintained at a value lower than the predefined integrity risk.

Figure 2:
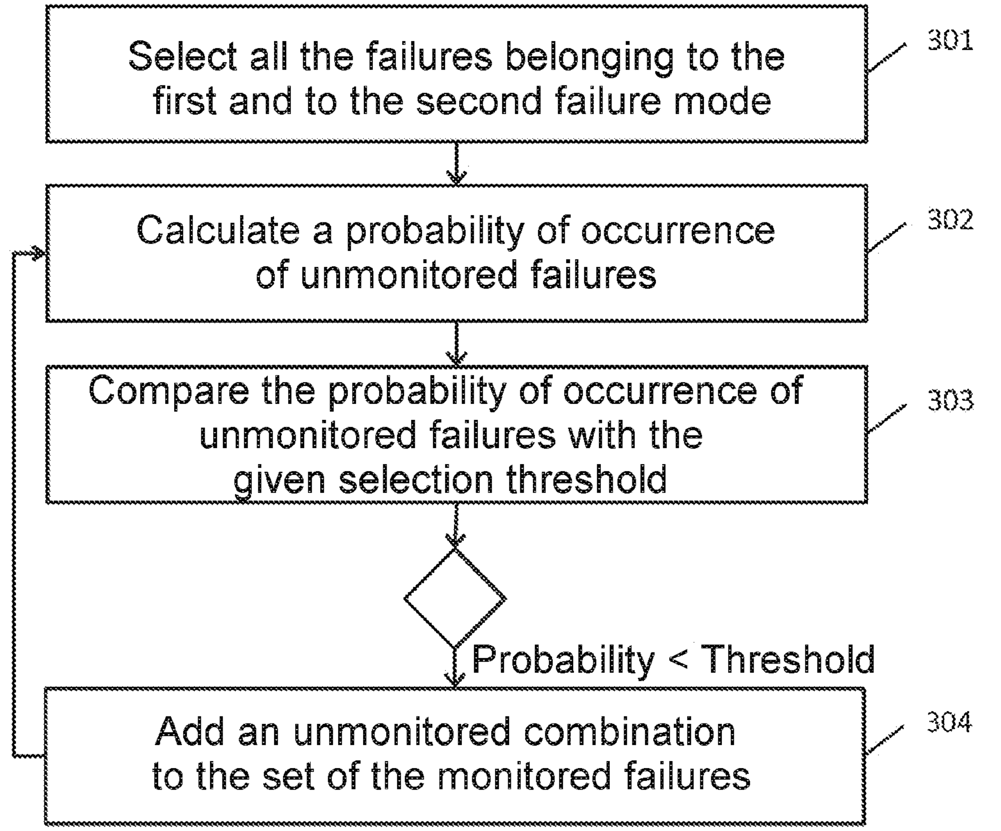
FIG. 2 is a flow diagram representing the steps implemented for selecting failures to be monitored by a radioelectric device, according to one embodiment of the invention.

FIG. 2 shows steps implemented for selecting failures to be monitored by a radioelectric device 20, according to a third embodiment of the invention. The third embodiment may use two satellite constellations 100, 200 such as shown in FIG. 1, where a first satellite constellation 100 has probabilities of occurrence of failures such that the probability of occurrence of a multiple failure or of a combination of single failures is lower than a predefined integrity risk. Furthermore, the selection of the failures to be monitored is made according to the third embodiment as a function of a given selection threshold $P_{THRESH}$. The selection of the failures to be monitored according to such an embodiment is particularly related to the combinations of a single failure of the first constellation 100 and of any given failure of the second constellation 200. In this case, the radioelectric device 20 may not monitor all the possible combinations; some combinations are not therefore monitored and they are excluded from the third failure mode.

At the step 301, the radioelectric device 20 may select all the failures belonging to the first and to the second failure mode such as defined hereinabove, in other words all of the single failures of the first and of the second constellation 200, and all those corresponding to the occurrence of a multiple failure or of several single failures in the second constellation 200, which supplies a set of the monitored failures not containing any combinations of a single failure of the first constellation 100 and of any given failure of the second constellation 200.

At the step 302, the radioelectric device 20 may calculate, based on all of the monitored failures, a probability of occurrence of unmonitored failures. An initial probability of occurrence of unmonitored failures may be determined using all of the monitored failures selected at the step 301.

At the step 303, the radioelectric device 20 may compare the probability of occurrence of unmonitored failures with the given selection threshold. The probability of occurrence of unmonitored failures may be higher than, lower than or substantially equal to the given selection threshold.

At the step 304, executed when the probability of occurrence of unmonitored failures is lower than the given selection threshold, a combination of a single failure of the first constellation 100 and of any given failure, single or multiple, of the second constellation 200, is added to all of the monitored failures, the added combination becoming a monitored combination and consequently included in the third failure mode. The steps 302 and 303 may subsequently be executed taking into account all of the monitored failures such as updated.

The steps 302, 303 and 304 may be iterated a finite number of times until the probability of occurrence of unmonitored failures reaches the given selection threshold. Following the iterative execution of the steps 302, 303 and 304, the probability of occurrence of unmonitored failures substantially reaches the given selection threshold.

In a fourth embodiment, the addition of the combinations of a single failure of the first constellation 100 and of any given failure of the second constellation 200 to all of the monitored failures such as described in relation with FIG. 2 may be carried out according to an increasing or decreasing order of a given selection metric. In the case where the probability of occurrence of a single failure in the first constellation 100 is different from one satellite to another, the combinations associated with the highest probabilities of occurrence of a single failure may be added first, which corresponds to an uncertainty metric associated with the navigation signals supplied by the first satellite constellation 100.

In another embodiment, the addition of the combinations of a single failure of the first constellation 100 and of any given failure of the second constellation 200 to all of the monitored failures may be carried out according to another selection metric corresponding to the degradation in a horizontal and/or vertical plane of the covariance matrix of the positioning error. In such an embodiment, the combinations associated with a minimal degradation in a horizontal and/or vertical plane of the covariance matrix of the positioning error with respect to the covariance matrix of the positioning error obtained using all the satellites of the first constellation 100 are added first.

Alternatively, the addition of the combinations of a single failure of the first constellation 100 and of any given failure of the second constellation 200 to all of the monitored failures may be carried out by adding first the combinations associated with a minimal impact on the calculation of the protection levels (the selection metric is then the impact of the combinations on the calculation of the protection levels). The protection levels $PL_q$ may be obtained by resolving the following equation:

$$2Q\left(\frac{PL_q - b_q^{(0)}}{\sigma_q^{(0)}}\right) + \sum_{k=1}^{N_{PS}} P_{failure,k} Q\left(\frac{PL_q - T_{k,q} - b_q^{(k)}}{\sigma_q^{(k)}}\right) \le \frac{1}{2 \times n_{es}}(PHMI - P_{PNS}) \quad (4)$$

where Q(x) represents the distribution function of the reduced centered normal law. $T_{k,q}$ represents the threshold with which the difference between the main navigation solution and the robust navigation sub-solution is compared at the failure k in the direction q, $$b_q^{(k)}$$

represents the maximum positioning error in the direction q caused by the bias affecting each measurement used in the calculation of the robust sub-solution at the failure k and $$\sigma_q^{(k)}$$

represents the standard deviation of the error in position in the direction q of the robust sub-solution at the failure k, and $n_{es}$ is the number of independent samples (for example 360 or else 450) over the period of exposure applicable to the operation in question (for example one hour). $P_{failure,k}$ is the probability of occurrence of the failure k, calculated according to which of the three identified failure modes the failure k belongs.

Numbering the failures from 1 to $N_{PS}$ (the number of monitored failures), then: For k=1 to $N^{(1)}$ (first part of the first mode: single failures of the first constellation)

$$P_{failure,k} = P_{no\ failure} \frac{P_{sat,k}^{(1)}}{1 - P_{sat,k}^{(1)}}$$

For $k=N^{(1)}+1$ to $N^{(1)}+N^{(2)}$ (second part of the first mode: sub-mode of the single failures of the second constellation)

$$P_{failure,k} = P_{no\ failure} \frac{P_{sat,k-N^{(1)}}^{(2)}}{1 - P_{sat,k-N^{(1)}}^{(1)}}$$

For $k=N^{(1)}+N^{(2)}+1$ (second mode—multiple failure in the second constellation)

$$P_{failure,k} = P_{no\ failure}^{(1)} \left(1 - P_{no\ failure}^{(2)} - P_{no\ failure}^{(2)} \sum_{i=1}^{N^{(2)}} \frac{P_{sat,i}^{(2)}}{1 - P_{sat,i}^{(2)}}\right)$$

For $k=N^{(1)}+N^{(2)}+2$ to $N_{PS}$ (third mode—sub-set of single failures of the first constellation combined with any given failure of the second constellation)

$$P_{failure,k} = P_{no\ failure}^{(1)} \frac{P_{sat,k-N^{(1)}-N^{(2)}-1}^{(1)}}{1 - P_{sat,k-N^{(1)}-N^{(2)}-1}^{(1)}} \left(1 - P_{no\ failure}^{(2)}\right)$$

In a fifth embodiment of the invention, the number of unmonitored combinations of a single failure of the first constellation 100 and of any given failure of the second constellation 200 may be initially fixed as a function of the probabilities of occurrence of single and multiple failures of the two satellite constellations 100, 200. For example, the number of unmonitored combinations of a single failure of the first constellation 100 and of any given failure of the second constellation 200 may be greater than or equal to 2. Advantageously, by using the one of the selection metrics described in relation with the fourth embodiment, the unmonitored combinations of a single failure of the first constellation 100 and of any given failure of the second constellation 200 may correspond to a maximum degradation of the selection metric, for example a maximum uncertainty associated with the navigation signals supplied by the first satellite constellation 100.

Figures 3, 4:
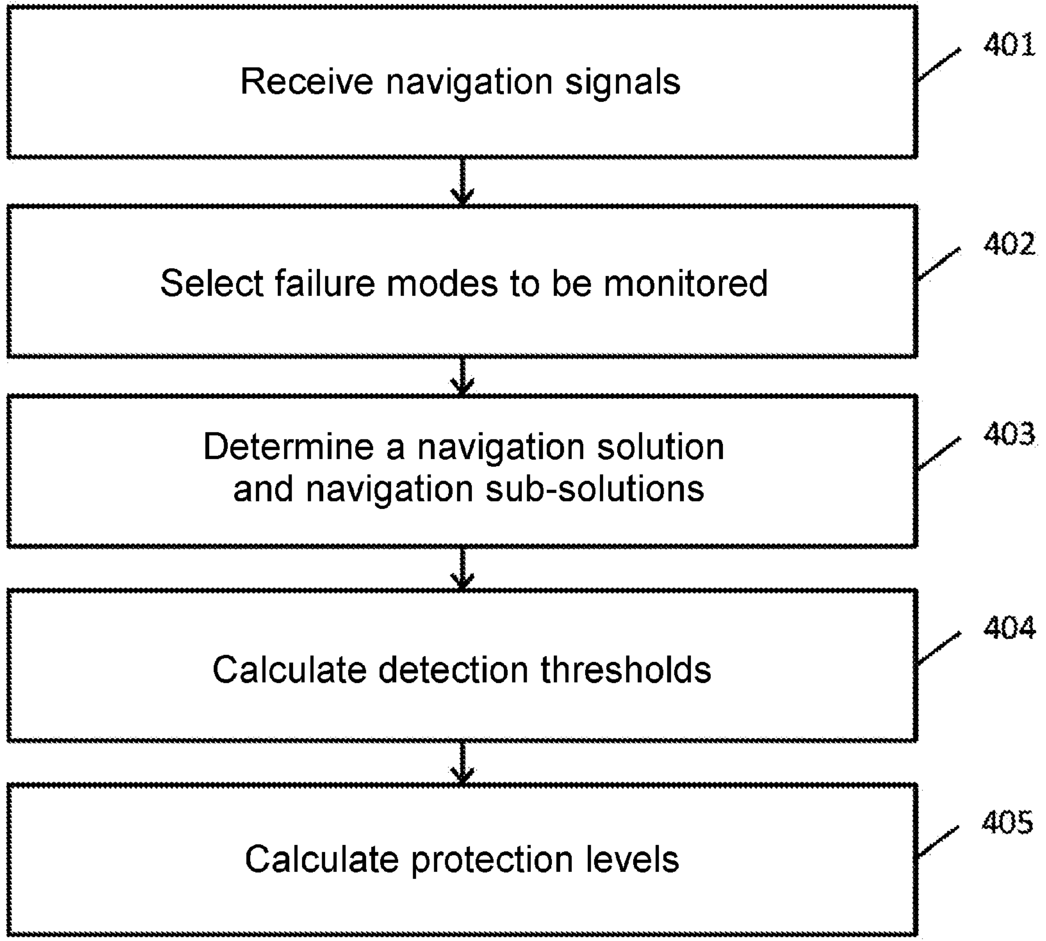
FIG. 3 is a comparison table showing the reduction in the number of monitored failures using a selection method according to embodiments of the invention.
FIG. 4 is a flow diagram representing a method for localizing radioelectric devices using two satellite constellations, according to one embodiment of the invention.

FIG. 3 is a table representing the number of failures monitored by the radioelectric device 20 using a selection algorithm of the prior art, according to the approach described in the article [Blanch, and al., "Baseline advanced RAI M user algorithm and possible improvements", IEEE Transactions on Aerospace and Electronic Systems, 2015]. The table in FIG. 3 shows, in the rows 1 and 2, the number of failures monitored by the radioelectric device for various numbers of visible satellites and for various values of the probabilities of occurrence of failures in the second satellite constellation 200. The table also shows the number of monitored failures according to the second embodiment of the invention in the row 3 and according to the third embodiment in the row 4. The embodiments of the invention thus allow the number of monitored failures to be considerably reduced, and consequently, the processing load needed to determine the navigation sub-solutions and the protection levels to be reduced.

FIG. 4 shows a method for localizing radioelectric device 20 using two satellite constellations 100, 200 comprising a first 100 and a second satellite constellation 200, the first satellite constellation 100 having probabilities of occurrence of failures such that the probability of occurrence of a multiple failure or of a combination of single failures is lower than a predefined integrity risk. The radioelectric device 20 may be simultaneously visible from several non-geostationary satellites 101, 201 belonging to the first 100 and to the second satellite constellation 200.

At the step 401, the radioelectric device 20 may receive navigation signals from all the visible non-geostationary satellites 101, 201. Generally speaking, a navigation signal received by a radioelectric device 20 allows the determination of a geographical place in which the radioelectric device 20 is located, where such a geographical place may correspond to a sphere centered on the position of the transmitting non-geostationary satellite, assumed to be known exactly by the radioelectric device 20 from the almanac tables for the non-geostationary satellite, and assuming as radius a pseudo-distance determined from the time difference taken by the navigation signal to reach the radioelectric device 20.

At the step 402, the radioelectric device 20 may select failure modes to be monitored. The selection of the failure modes to be monitored may be made according to one of the embodiments of the invention described hereinabove. For example, the radioelectric device 20 may select the first, the second and the third failure mode. Advantageously, the number of monitored combinations of a single failure of the first constellation 100 and of any given failure of the second constellation 200 may be optimized as described in relation with FIG. 2 or as described in relation with the fifth embodiment of the invention.

Those skilled in the art will understand that the order in which the steps 401 and 402 are executed may be alternated. For example, the step 402 may be executed first.

At the step 403, using the navigation signals coming from all the visible satellites, the radioelectric device 20 may determine a navigation solution, also called main navigation solution, representing the position of the radioelectric device 20 within a given reference frame. In particular, one or more navigation signal used for calculating the main navigation solution may come from one or more visible defective satellites. Furthermore, the radioelectric device 20 may furthermore determine navigation sub-solutions, where each navigation sub-solution excludes, in other words does not take into account, one or more navigation signals supplied by one or more visible satellites associated with a failure mode selected at the exit from the step 402.

For example, by considering two satellite constellations 100, 200 each comprising 10 non-geostationary satellites 101, 201 which are all visible by the radioelectric device 20, the radioelectric device 20 can calculate, in relation with the first failure mode, 20 navigation sub-solutions, where each navigation sub-solution uses 19 visible satellites and excludes one visible satellite different from the other navigation sub-solutions. In relation with the second failure mode, the radioelectric device 20 can calculate a navigation sub-solution using the 10 visible satellites of the first constellation 100 and no satellite from the second constellation 200. In relation with the third failure mode, the radioelectric device can, in theory, calculate up to 10 navigation sub-solutions using 9 visible satellites of the first constellation 100 and no visible satellite from the second constellation. This number of 10 may subsequently be optimized in order to reduce the processing load in the radioelectric device according to one of the embodiments described hereinabove.

Thus, in the case of failures affecting one or more visible non-geostationary satellites 101, 201, one sub-solution from amongst the navigation sub-solutions can correctly estimate the real position of the radioelectric device 20, whereas the main navigation position is erroneous.

Furthermore, at the step 403, the radioelectric device 20 can calculate the differences separating the main navigation solution from each of the navigation sub-solutions. For example, by considering a solution and a navigation sub-solution, two differences may be calculated in the horizontal plane in two perpendicular directions and a third difference may be measured in the vertical direction.

At the step 404, the radioelectric device 20 can calculate failure detection thresholds as a function of a probability of false alarm previously predefined and as a function of the uncertainties associated with the differences between the main navigation solution and the navigation sub-solution, one or more detection thresholds being calculated for each of the navigation sub-solutions. The step 404 may furthermore comprise a comparison, for each of the navigation sub-solutions, between the difference between the main navigation solution and the navigation sub-solution such as calculated at the step 403 with the corresponding failure detection threshold, which allows it to be determined, for each navigation sub-solution, whether a failure non-detection condition is satisfied or otherwise, the failure non-detection condition being satisfied if the difference between the main navigation solution and the navigation sub-solution is less than at least one corresponding detection threshold.

At the step 405, if the failure non-detection condition is satisfied for all the navigation sub-solutions, in other words all the differences calculated at the step 403 are less than the corresponding detection thresholds calculated at the step 404, the radioelectric device 20 can calculate a horizontal protection level and/or a vertical protection level as a function of one or of several parameters from amongst: an integrity value adjusted notably by the probabilities of occurrence of unmonitored failures, the probabilities of occurrence of monitored failures, the detection thresholds or, alternatively, the differences between the main navigation solution and the navigation sub-solutions, the uncertainty in positioning of the main navigation solution and of the navigation sub-solutions, etc.

Advantageously, the localization method may furthermore comprise an additional step consisting in triggering the transmission by the radioelectric device 20 of an alarm message (or notification), for example intended for its user, when at least a difference between the main navigation solution and a navigation sub-solution is greater than the corresponding detection threshold.

In one embodiment of the invention, the first satellite constellation 100 associated with minimal probabilities of occurrence of failures with respect to the rest of the constellations of a satellite system 10 may have a probability of occurrence of single failures lower than $2\times10^{-5}$ and a probability of occurrence of multiple failures lower than $10^{-7}$.

In another embodiment of the invention, the second satellite constellation 200 associated with probabilities of occurrence of failures higher than those of the first constellation 100 may have a probability of occurrence of failures, single or multiple, lower than $10^{-3}$.

Those skilled in the art will understand that the method for localizing radioelectric devices 20 according to the invention may be applied to a satellite system 10 comprising any number greater than or equal to 2 of satellite constellations with a first constellation 100 having probabilities of occurrence of failures such that the probability of occurrence of a multiple failure or of a combination of single failures is lower than a predefined integrity risk.

In one embodiment, the calculation of a protection level, horizontal or vertical for example, may be carried out in an iterative manner by searching for a minimum in a given cost function. Advantageously, the search may be effected according to an iterative minimization method and the number of iterations used to achieve this may be less than three.

Figure 5:
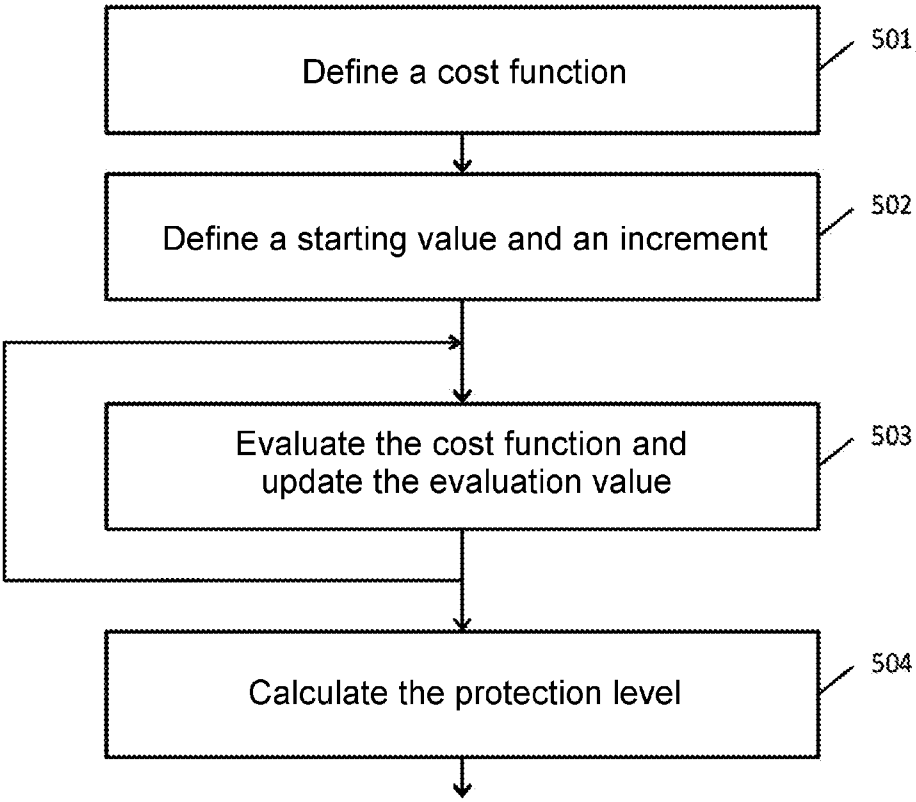
FIG. 5 is a flow diagram representing the steps implemented for calculating protection levels by a radioelectric device, according to one embodiment of the invention.

FIG. 5 illustrates the steps implemented for calculating a protection level according to such an embodiment of the invention.

At the step 501, a cost function, $f_q(x)=h_q(x)-PHMI_q$, corresponding to the difference between the risk of exceeding the protection level x by the positioning error ($h_q(x)$) and an adjusted integrity allocation ($PHMI_q$), may be defined based on several parameters such as the number of monitored failures ($N_{PS}$), the probability of occurrence of monitored failures ($p_{failure,k}$) and/or unmonitored failures, the standard deviations of the position error $$\left(\sigma_q^{(k)}\right),$$

the comparison thresholds ($T_{k,q}$) and/or the positioning errors $$\left(b_q^{(k)}\right),$$

etc. The risk of exceeding the protection level x by the positioning error $h_q(x)$ may be written in the following form:

$$h_q(x) = 2\overline{Q}\left(\frac{x-b_q^{(0)}}{\sigma_q^{(0)}}\right) + \sum_{k=1}^{N_{PS}} p_{failure,k}\overline{Q}\left(\frac{x-T_{k,q}-b_q^{(k)}}{\sigma_q^{(k)}}\right) \quad (5)$$

At the step 502, a starting value, $x_0$, and an increment, A, may be defined. The starting value may for example be one of the limits or the center of the search domain. The upper limit may for example be obtained by allocating each monitored failure mode an equal portion of the integrity allocation, notably adjusted by the probability of occurrence of the unmonitored failures. The lower limit may for example be fixed at 0 or be obtained by allocating to each monitored failure mode the entirety of the adjusted integrity allocation. Furthermore, the increment may, for example, be greater than half of the tolerance $$V_{TOL}\left(\Delta = \frac{V_{TOL}}{2}\right)$$

on the estimation of x.

At the step 503, the cost function is evaluated at the starting value. Subsequently, the value of the search domain, $x_{n+1}$, may be updated as a function of the elements comprising the old value of the search interval, $x_n$, the increment, and the results of the evaluation of the cost function and of its derivatives with respect to $x_n$. For example the value of $x_{n+1}$ may be obtained according to the following relationship:

$$x_{n+1} = x_n - \mathrm{sign}\left(\frac{f_q(x_n)}{f_q'(x_n)}\right) \times \left(\left|\frac{f_q(x_n)}{f_q'(x_n)}\right| + \Delta\right) \quad (6)$$

Advantageously, the step 503 may be iterated a maximum number of times, for example a maximum number of times less than or equal to three.

The step 504 may be executed when the maximum number of times is reached. At the step 504, the value of $x_n$ such that $f_q(x)$ is a minimum may be retained. Such a value of $x_n$ may correspond to the protection level sought.

Figure 6:
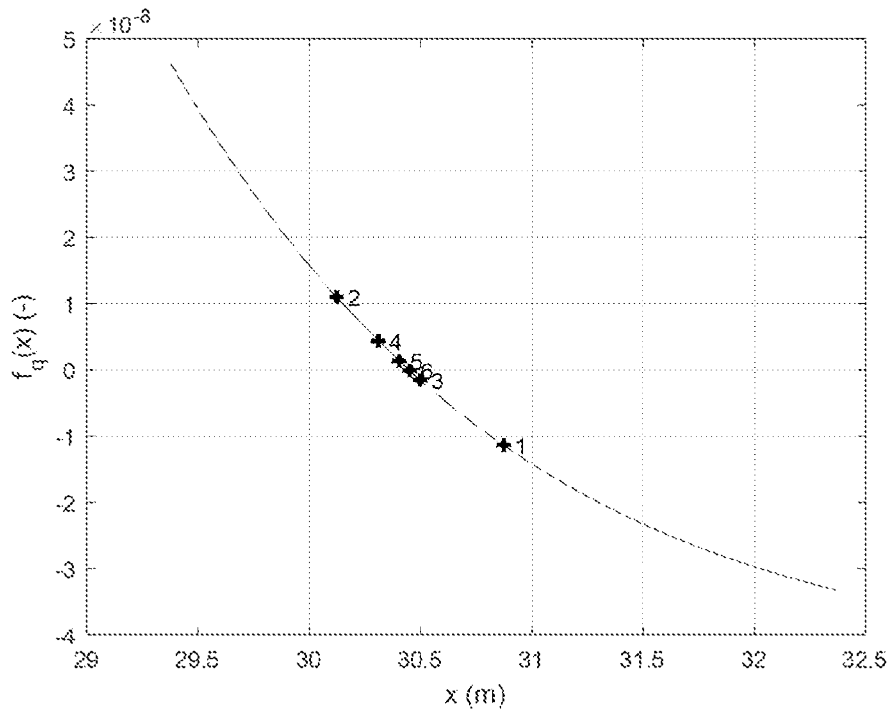
FIG. 6.
Figure 7:
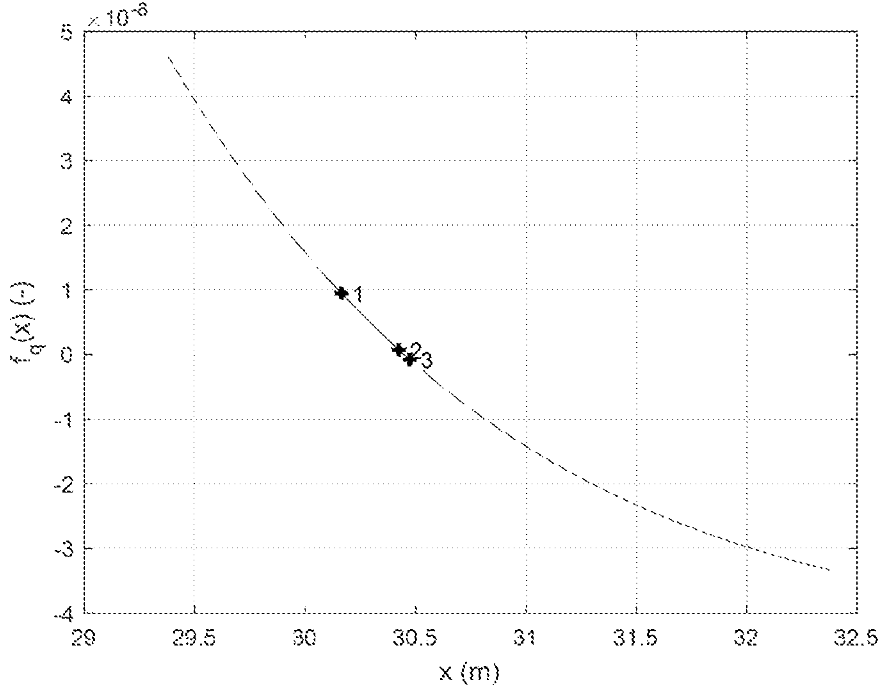
FIG. 7 compares the performance of the methods of the prior art and the performance of a method for calculating the protection levels according to one embodiment of the invention.

FIGS. 6 and 7 illustrate the performance of the embodiment described in relation with FIG. 5 (FIG. 7) with respect to the solutions of the prior art (FIG. 6) such as that described in [Blanch, and al., "Baseline advanced RAI M user algorithm and possible improvements", IEEE Transactions on Aerospace and Electronic Systems, 2015] which uses a resolution by dichotomy requiring a number of iterations higher than 6. FIG. 7 shows that the method of calculating the protection levels according to the invention converges after 3 iterations toward the optimum value.

The embodiment in FIG. 5 has the advantage of only using a reduced number of iterations for the determination of protection levels, in contrast to the solutions of the prior art where the number of iteration is generally in the range between 6 and 10.

Figure 8:
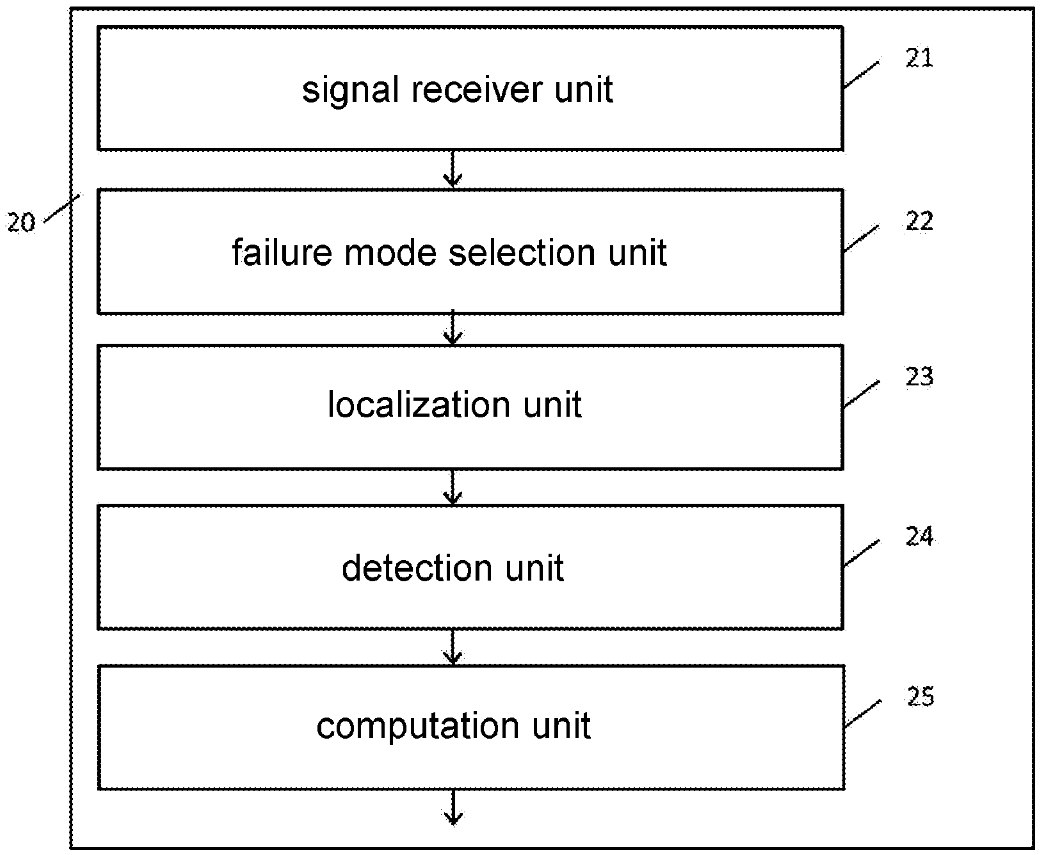
FIG. 8 is one example of an architecture of a radioelectric device, according to one embodiment of the invention.

FIG. 8 shows the architecture of a radioelectric device 20 to be localized according to one embodiment of the invention. Such an architecture may comprise:

- a signal receiver unit 21 designed to receive navigation signals from several visible satellites belonging to at least two satellite constellations 100, 200;
- a failure mode selection unit 22 designed to select one or more failure modes to be monitored;
- a localization unit 23 designed to determine, using the received navigation signals and based on the selected failure modes, a main navigation solution and one or more navigation sub-solutions;
- a detection unit 24 designed to determine whether a failure non-detection conditions is verified based on the navigation solution and on the navigation sub-solutions;
- a computation unit 25 designed to calculate one or more protection levels for the navigation solution.

Those skilled in the art will understand that the method for localizing radioelectric devices 20 according to the embodiments may be implemented in various ways by hardware, software, or a combination of hardware and software, notably in the form of program code able to be distributed in the form of a program product, taking various forms. In particular, the program code may be distributed by means of media readable by computer, which may include storage media readable by computer and communications media. The methods described in the present description may notably be implemented in the form of computer program instructions executable by one or more processors in a computer data processing device. These computer program instructions may also be stored in a medium readable by computer.

The invention claimed is:

1. A method for localizing radioelectric devices, implemented in a satellite system comprising a plurality of satellite constellations, each satellite constellation comprising one or more non-geostationary satellites, each satellite constellation being associated with probabilities of occurrence of failures comprising a probability of occurrence of single failures and a probability of occurrence of multiple failures, a single satellite failure being a failure involving only a single satellite of a constellation and a multiple failure being a failure involving at least two satellites of the same constellation breaking down for a common cause, said satellite system comprising at least a first constellation associated with a probability of occurrence of multiple failures less than a given integrity risk, at least a second satellite constellation, and at least one radioelectric device to be localized receiving navigation signals coming from a plurality of said non-geostationary satellites, wherein the method comprises the following steps implemented by a radioelectric device and comprising:

receiving a plurality of navigation signals coming from a plurality of visible non-geostationary satellites belonging at least to said first and second satellite constellation;

selecting failure modes to be monitored corresponding to failures of the satellite constellations;

for each selected failure mode, determining a navigation solution representing a position of the radioelectric device within a given reference frame, using said plurality of received navigation signals, and determining a plurality of navigation sub-solutions, each of said navigation sub-solutions corresponding to a position of the radioelectric device within said given reference frame determined using the received navigation signals other than the navigation signals coming from one or more visible non-geostationary satellites associated with said selected failure mode;

calculating, for each navigation sub-solution, one or more corresponding detection thresholds, a failure non-detection condition being satisfied if the differences between said navigation solution and the navigation sub-solution are less than said one or more corresponding detection thresholds; and calculating one or more protection levels associated with said navigation solution, if the failure non-detection condition is satisfied for all the navigation sub-solutions, said method being wherein said selected failure modes to be monitored are:

a first failure mode corresponding to all of the single satellite failures of said first and of said second constellation;

a second failure mode corresponding to the occurrence of a multiple failure or the combination of several single satellite failures in said second constellation; and a third failure mode corresponding to a plurality of combinations of a single satellite failure of said first constellation and of a failure, single or multiple, of said second constellation.

2. The method as claimed in claim 1, wherein the probability of occurrence of a combination of single satellite failures in said first constellation is lower than the given integrity risk.

3. The method as claimed in claim 1, comprising the determination of said plurality of combinations associated with said third failure mode as a function of a given selection threshold, the determination of said plurality of combinations associated with said third failure mode comprising the steps comprising:

a. selecting all of the failures belonging to the first failure mode and to the second failure mode, which supplies a set of the monitored failures;

b. calculating a probability of occurrence of unmonitored failures as a function of said set of the monitored failures;

c. comparing said probability of occurrence of unmonitored failures with said given selection threshold; and d. if said probability of occurrence of unmonitored failures is lower than said given selection threshold, adding an unmonitored combination of a single satellite failure of said first constellation and of a failure, single or multiple, of said second constellation to said set of the monitored failures, said added combination being furthermore added to said third failure mode, wherein the steps b. to d. are iterated until said probability of occurrence of unmonitored failures reaches substantially said given selection threshold.

4. The method as claimed in claim 3, wherein said unmonitored combinations of a single satellite failure of said first constellation and of a failure, single or multiple, of said second constellation are added to said set of the monitored failures according to an increasing or decreasing order of a selection metric, the selection metric being a metric chosen from amongst:

an uncertainty metric associated with the navigation signals supplied by said first constellation;

a minimization metric associated with a covariance matrix of the positioning error of the sub-solutions relating to said third failure mode; and a metric associated with the impact on the complexity of calculation of said protection levels.

5. The method as claimed in claim 1, wherein the number of unmonitored combinations of a single satellite failure of said first constellation and of a failure, single or multiple, of said second constellation is predefined and is chosen to be greater than or equal to two.

6. The method as claimed in claim 1, wherein said one or more protection levels are calculated in an iterative manner by minimizing a predefined cost function, said predefined cost function corresponding to the difference between a risk of exceeding the protection level by the positioning error and an adjusted integrity allocation and according to which, at an iteration n+1, the value of the risk of exceeding $x_n+1$ is obtained by means of the following formula:

$$x_{n+1} = x_n - \operatorname{sgn}\left(\frac{f_q(x_n)}{f_q'(x_n)}\right) \times \left(\left|\frac{f_q(x_n)}{f_q'(x_n)}\right| + \Delta\right)$$

with: $x_n$ the value of the risk of exceeding at the iteration n, $f_q(x_n)$ the value of the cost function obtained for a risk of exceeding equal to $x_n$ and $\Delta$ an increment of a predefined value.

7. The method as claimed in claim 6, wherein the number of iterations is less than or equal to three.

8. The method as claimed in claim 1, wherein said one or more protection levels comprises a horizontal protection level.

9. The method as claimed in claim 1, wherein said at least one radioelectric device is airborne by means of an aircraft, said one or more protection levels comprising a horizontal protection level and a vertical protection level.

10. The method as claimed in claim 1, wherein said probability of occurrence of single satellite failures and said probability of occurrence of multiple failures associated with the first constellation are less than $2\times10^{-5}$ and less than $10^{-7}$, respectively.

11. The method as claimed in claim 1, wherein said probability of occurrence of single satellite failures and said probability of occurrence of multiple failures associated with the second constellation are less than $10^{-3}$.

12. A radioelectric device implemented in a satellite system comprising a plurality of satellite constellations, each satellite constellation comprising one or more non-geostationary satellites, each satellite constellation being associated with probabilities of occurrence of failures comprising a probability of occurrence of single satellite failures and a probability of occurrence of multiple failures, a single satellite failure being a failure involving only a single satellite of a constellation and a multiple failure being a failure involving at least two satellites of the same constellation breaking down for a common cause, said satellite system comprising at least a first constellation associated with a probability of occurrence of multiple failures lower than a given integrity risk, at least a second satellite constellation, and at least one radioelectric device to be localized receiving navigation signals coming from a plurality of said non-geostationary satellites, said radioelectric device comprising:

one or more processors; and memory storing instructions that, when executed by the one or more processors, cause the device to:

receive a plurality of navigation signals coming from a plurality of visible non-geostationary satellites belonging at least to said first and second satellite constellation;

select failure modes to be monitored corresponding to failures of the satellite constellations;

for each selected failure mode, determine a navigation solution representing a position of the radioelectric device within a given reference frame, using said plurality of received navigation signals, and to determine a plurality of navigation sub-solutions, each of said navigation sub-solutions corresponding to a position of the radioelectric device within said given reference frame determined using the received navigation signals other than the navigation signals coming from one or more visible non-geostationary satellites associated with said selected failure mode;

calculate, for each navigation sub-solution, one or more corresponding detection thresholds, a failure non-detection condition being satisfied if the differences between said navigation solution and the navigation sub-solution are less than said one or more corresponding detection thresholds; and calculate one or more protection levels associated with said navigation solution, if the failure non-detection condition is satisfied for all the navigation sub-solutions, wherein said selected failure modes to be monitored are:

a first failure mode corresponding to all of the single satellite failures of said first and of said second constellation;

a second failure mode corresponding to the occurrence of a multiple failure or the combination of several single satellite failures in said second constellation; and a third failure mode corresponding to a plurality of combinations of a single satellite failure of said first constellation and of a failure, single or multiple, of said second constellation.

* * * * *